US007340373B2

(12) United States Patent
Shimomura

(10) Patent No.: US 7,340,373 B2
(45) Date of Patent: Mar. 4, 2008

(54) WEIGHT DETECTING APPARATUS FOR CRANE AND CRANE HAVING THE SAME

(75) Inventor: Koichi Shimomura, Akashi (JP)

(73) Assignee: Kobelco Cranes Co., Ltd., Tokyo (JP)

( * ) Notice: Subject to any disclaimer, the term of this patent is extended or adjusted under 35 U.S.C. 154(b) by 0 days.

(21) Appl. No.: 11/401,935

(22) Filed: Apr. 12, 2006

(65) Prior Publication Data

US 2006/0259270 A1 Nov. 16, 2006

(30) Foreign Application Priority Data

May 16, 2005 (JP) ............................ 2005-142329

(51) Int. Cl.
*G01G 7/00* (2006.01)

(52) U.S. Cl. ...................................................... 702/173

(58) Field of Classification Search ................. 702/173
See application file for complete search history.

(56) References Cited

U.S. PATENT DOCUMENTS

| | | | | |
|---|---|---|---|---|
| 4,557,390 | A * | 12/1985 | Mick | 212/197 |
| 6,474,485 | B1 * | 11/2002 | Yokoyama | 212/195 |
| 2005/0248454 | A1 * | 11/2005 | Hanson et al. | 340/539.26 |
| 2005/0258122 | A1 * | 11/2005 | Morath | 212/294 |
| 2006/0191457 | A1 * | 8/2006 | Murphy | 114/253 |

FOREIGN PATENT DOCUMENTS

| | | | |
|---|---|---|---|
| EP | 1167638 | A1 * | 1/2002 |
| JP | 8-217382 | | 8/1996 |
| JP | 9-58978 | | 3/1997 |
| JP | 10-203784 | | 8/1998 |
| JP | 2001-80885 | | 3/2001 |
| WO | WO 9855388 | A1 * | 12/1998 |

OTHER PUBLICATIONS

Lindsay, J., Reade, W.; Cascading RFID Tags, Nov. 7, 2003, (http://www.jefflindsay.com/rfid3.shtml, viewed on Dec. 22, 2006).*

* cited by examiner

*Primary Examiner*—John Barlow
*Assistant Examiner*—Lisa C. Sievers
(74) *Attorney, Agent, or Firm*—Oblon, Spivak, McClelland, Maier & Neustadt, P.C.

(57) ABSTRACT

A weight detecting apparatus for a crane includes a base machine comprising a lower traveling body and an upper rotating body; weights mounted on this base machine; ID (identification) tags which are installed on the respective weights and in which ID information on weight mounting conditions has been written; and an ID reader for reading the ID information. In this weight detecting apparatus weight detecting apparatus, the mounting conditions of the weights are detected by wireless communications between the ID reader and the ID tags.

10 Claims, 4 Drawing Sheets

WEIGHT DETECTING APPARATUS FOR CRANE AND CRANE HAVING THE SAME

BACKGROUND OF THE INVENTION

1. Field of the Invention

The present invention relates to a weight detecting apparatus for detecting weight mounting conditions of a crane equipped with weights such as a counterweight, and a crane having the same.

2. Description of the Related Art

The following descriptions will be made taking a crawler crane as an example.

There are some cranes in which a carbody weight for enhancing the stability of its machine body by increasing the weight of a base machine, is mounted in the vicinity of the pivot of a carbody in a lower traveling body (refer to Japanese Patent No. 3424616).

On the other hand, there are some cranes in which a crawler weight is mounted on a crawler portion of the lower traveling body, and a weight referred to as a dummy weight is mounted in a winch space in an upper rotating body. Hereinafter, these various weights may be generically called "weights" in a simple way.

In the crawler crane, there is provided an overload preventing apparatus (generally referred to as a "moment limiter"). By this apparatus, a crane capability is set based on a variety of factors, such as mounting conditions of a weight or weights (the presence/absence of weights (or a weight), the number of weights, the position and mass of each individual weight, etc.), the length and angle of a boom, and the weight of a hoist load, and concurrently, overload preventing operations are performed, such as monitoring of a load, warning, and automatic stop of machine, are performed to prevent the working load from exceeding the aforementioned crane capability.

Hitherto, as means for detecting weight mounting conditions constituting one of the factors determining the crane capability, there are known techniques as follows:

(i) a technique using a proximity switch or a limiting switch as means for detecting the presence/absence of weights (counterweights) [refer to Japanese Unexamined Patent Application Publication Nos. 10-203784 and 8-217382].

(ii) a technique for detecting the weight of weights (counterweights), or moment loads (refer to Japanese Patent No. 3351662).

According to the technique in the above (i), however, it is necessary to exactly maintain the relationship between the detector and a position of the weight. This makes the installation of the detector troublesome under constrain of its installation position, while a positional displacement might be caused by vibrations during working, thereby raising a possibility of an erroneous detection.

Also, the detector used here is a switch, and hence, even though it can make a simple detection such as detection of the presence/absence of weights (or a weight), it cannot detect other factors determining the crane capability, such as the number of weights, the position and weight of each individual weight, etc.

On the other hand, the technique in the above (ii) can detect the weights of weights and/or a moment load, but it involves problems in that an arrangement for detection becomes complicated, and the detection accuracy with respect to the increase/decrease in the total weight of the counterweights is difficult to secure (in particular, when the total weight of the counterweights is large, a small weight change is difficult to detect).

Furthermore, in either one of the cases (i) and (ii), when detecting mounting conditions of the weights mounted on the lower traveling body side, such as carbody weights or dummy weights, it is necessary to add a transmission device, such as a slip ring serving as means for sending detected information to an overload preventing apparatus provided on the upper rotating body side, so that the detection structure becomes complicated. This makes it very difficult to retrofit the detection structure.

SUMMARY OF THE INVENTION

Accordingly, it is an object of the present invention to provide a weight detecting apparatus for a crane, allowing a detector to be easily installed at an optional position, and capable of obtaining stable detecting operations with high accuracy; and a crane capable of taking information on weight mounting conditions detected by the above-described weight detecting apparatus into an overload preventing apparatus, and of preventing an erroneous capability setting to perform reliable overload preventing operations.

That is, the weight detecting apparatus according to the present invention has the following basic constructions.

The present invention includes a base machine comprising a lower traveling body and an upper rotating body rotatably mounted on the lower traveling body; a weight for enhancing the stability of the machine body of the crane, the weight being mounted on the base machine; an identification (ID) information holding medium which is installed on the weight, and in which ID information on weight mounting conditions has been written; and an ID reader for reading the ID information, the ID reader being installed to the upper rotating body. Herein, the mounting conditions of the weight are detected by wireless communications between the ID reader and the ID information holding medium.

According to the present invention, an ID information holding medium is installed on a weight (counterweight or carbody weight), and ID information on weight mounting conditions, written in the ID information holding medium, is read by an ID reader installed to the upper rotating body, using wireless communications. Therefore, as compared with the case where a proximity switch or a limit switch is used, the ID information holding medium can be easily installed to an arbitrary position easy to install it, by sticking or embedding it without being subjected to any constraint of a physical position of the ID information holding medium.

In addition, the installation position of the above-described detector with respect to the weight does not affect its detection performance as long as it is located within the range allowing wireless communications. As a result, it is possible to achieve high-accuracy and stable detecting effect irrespective of variations in the installation position of the detector and/or positional displacements thereof after the installation thereof.

When a plurality of weights of the same kind or different kinds is mounted on the base machine, and an ID information holding medium is installed on each of the weights, information in each of the ID information holding media may be read by a single ID reader, or, for example, it may be read by a plurality of ID readers installed to each of the weights, or may be read by a plurality of ID readers installed for each of the kinds of weights (counterweight and carbody weight), with the readers being sorted by the kind of weight.

DESCRIPTION OF THE PREFERRED EMBODIMENTS

Embodiments according to the present invention will be described with reference to FIGS. 1 to 5.

Figure 1:
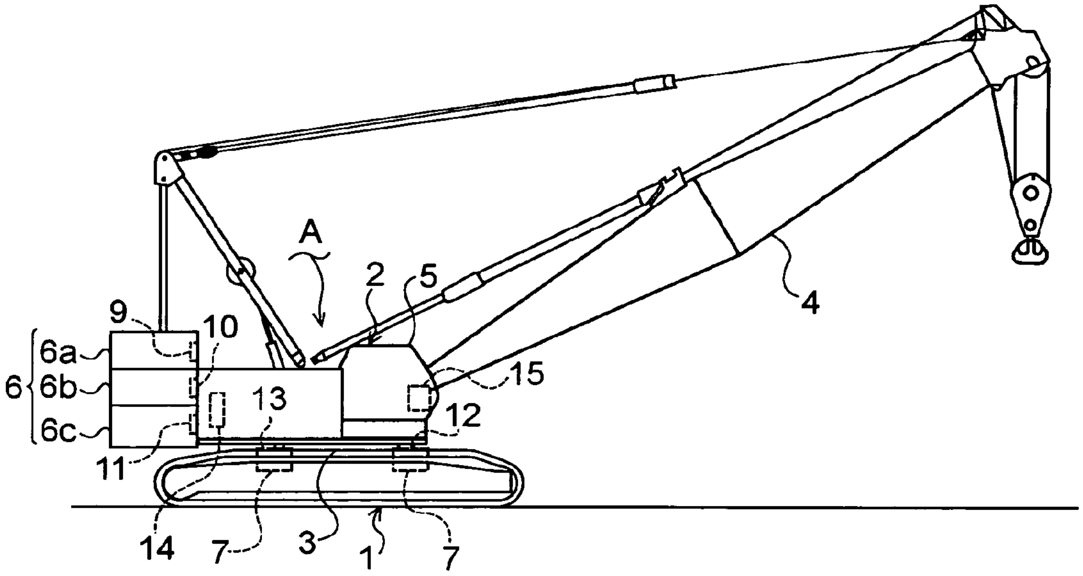
FIG. 1 is a side view of a crane according to an embodiment of the present invention.
Figure 2:
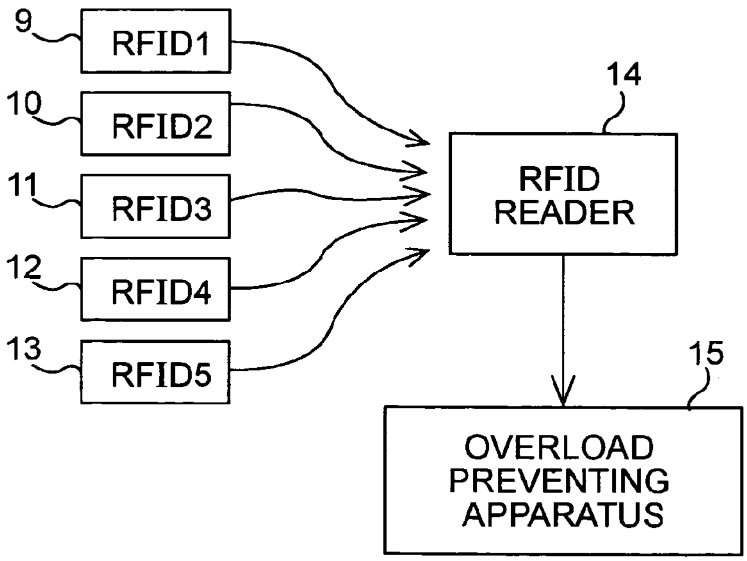
FIG. 2 is a block diagram of tags, readers, and an overload preventing apparatus according to the embodiment of the present invention.
Figure 3:
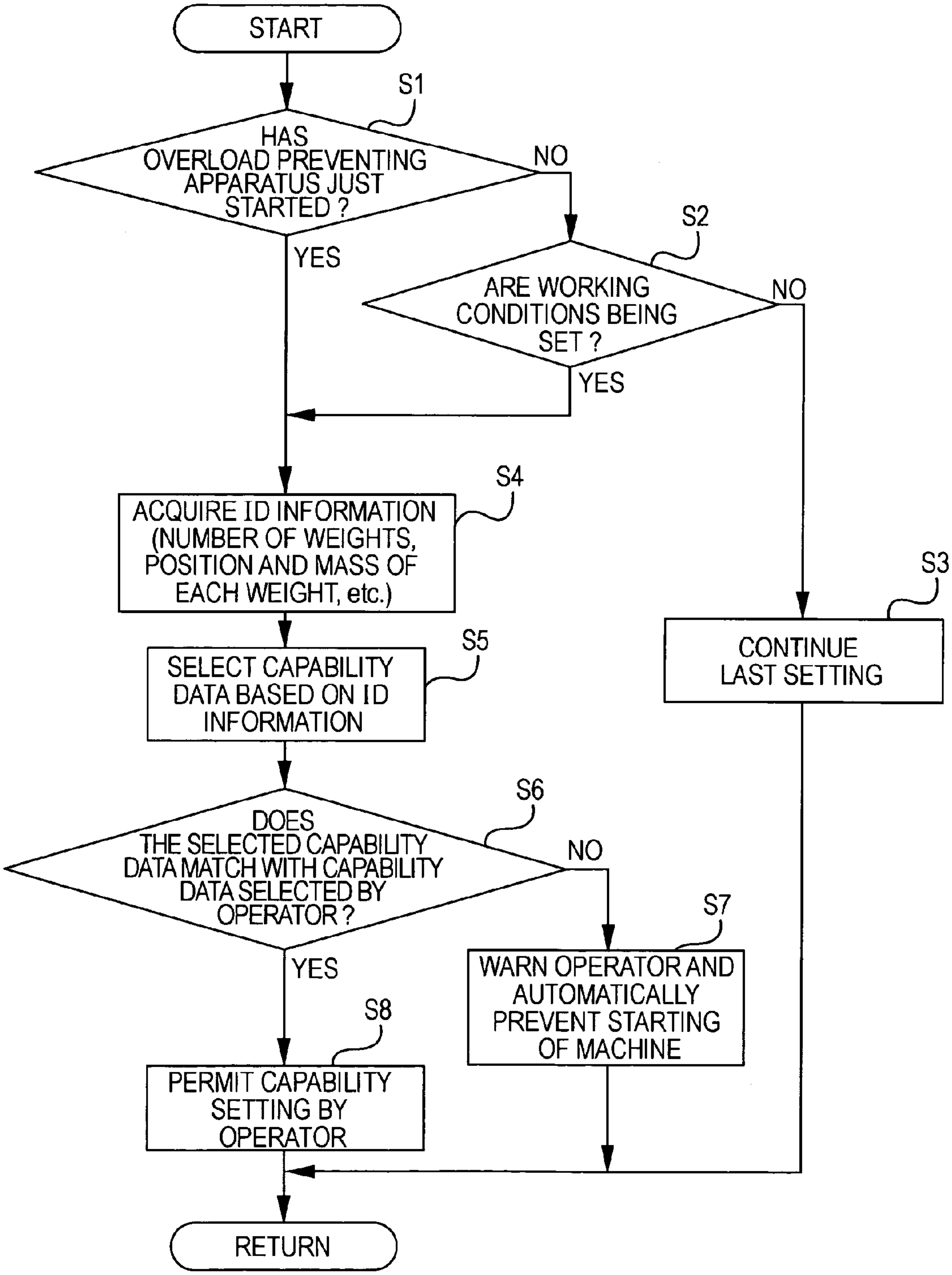
FIG. 3 is a flowchart explaining operations in the embodiment of the present invention.

Basic Embodiment (Refer to FIGS. 1 to 3)

In the following embodiments, a crane shown in FIG. 1 is taken as an example of an object to be applied. This crane has a lower traveling body 1 of a crawler type, and on this lower traveling body 1, an upper rotating body 2 is mounted via a slewing bearing 3, thereby constituting a base machine A together with the lower traveling body 1. In the forward portion of the upper rotating body 2 in the base machine A, there are provided a freely rising/falling boom 4 and a cabin 5. At the rear end of the upper rotating body 2, counterweights 6 constituted of vertically three-layered weight members 6*a*, 6*b*, and 6*c* installed for enhancing crane capability. On the other hand, carbody weights 7 are arranged on the lower traveling body 1. Here, the above-described counterweights 6 may be configured so that the plurality of weight members 6*a*, 6*b*, and 6*c* are arranged along the forward/backward direction, or alternatively, along the up/down direction and forward/backward direction in a combined manner.

The carbody weights 7 are disposed in the vicinity of the slewing bearing 3 in the carbody in the lower traveling body 1, and has the function of enhancing stability of the machine body of the crane by increasing the weight of the base machine, these carbody weights 7 being sometimes called "spacer weights".

The ID information holding medium is, for example, an ID detector (ID tag), which can detect mounting conditions of a weight.

In this embodiment, on the front side of the weight members (hereinafter these may be abbreviated as "weights") 6*a*, 6*b*, and 6*c* constituting the counterweight 6, and on the top surface side of the carbody weights 7, there are provided radio frequency identification (RFID) tags 9, 10, 11, 12, and 13 for transmitting ID information (in FIG. 2, branch numbers 1 to 5 for distinction are allocated to these tags 9 to 13, respectively).

Here, the RFID tag is sometimes called a wireless IC tag (a minute wireless IC chip used for identification of an object), and has information such as its own identification code therein recorded. The RFID tag has a capability of transmitting/receiving information to/from a management system by radio.

The RFID tags (hereinafter, these may be abbreviated as "tags") 9 to 13 each incorporate an IC chip as a recording member, and is capable of storing a large capacity of information and performing writing/updating operations. In addition, because of unnecessity of electric power, the tag needs no wiring and is maintenance-free. Thus, the tag has an optimum feature as a detector for detecting mounting condition of a weight.

The shape and installation means of each of the tags 9 to 13 can be selected from a variety of options. For example, each of these tags may be stuck to the surface of a weight as a card-shape or label-shape one, or alternatively, may be embedded in a weight as disk-shaped or rod-shaped one.

The tags 9 to 13 include identification codes (ID information) of positions of the corresponding weights to which they are installed (e.g., in the case of the counterweight 6 constituted of the weight members 6*a* to 6*c*, the positions of the corresponding weights are upper layer, middle layer, and lower layer); and identification codes of masses of the corresponding weights, the identification codes of the positions and masses having being written in the tags 9 to 13 in advance.

On the other hand, at a position apart from each of the weights in the upper rotating body 2, there is provided one RFID tag reader (hereinafter, this may be abbreviated as a "reader") 14. ID information written in the tags 9 to 13 is read by the reader 14 by wireless communications between the tags 9 to 13 and the reader 14.

As a result, mounting conditions of the weights 6*a* to 6*c*, and 7, that is, the construction of the counterweight 6 (vertically three-layered construction); an individual mass of each of the weight members 6*a* to 6*c* and a total mass thereof; and positions of the carbody weights 7, and individual masses and a total mass thereof, are detected.

In this manner, the mounting conditions of the weights 6*a* to 6*c*, and 7 are detected by the tags 9 to 13 and the reader 14. Thereby, as compared with the case where a proximity switch or a limit switch is used, the tags 9 to 13 can be easily installed to an arbitrary position easy to install them, by sticking or embedding them without being subjected to any constraint of physical positions of the tags 9 to 13 serving as detectors.

In addition, the installation positions of the tags 9 to 13 with respect to the weights 6*a*-6*c* and 7 do not affect their detection performance as long as they are located within the range allowing wireless communications. This makes it possible to always achieve a highly-accurate and stable detecting effect irrespective of variations in the installation positions of the tags 9 to 13 and/or positional displacements the tags 9-13 after the installation thereof.

According to the above-described arrangement, a moment constituting a factor determining the crane capability can be detected in order to write, in each of the tags, an identification code of the mass of a pertinent weight or those of the mass and position of the weight.

In particular, according to the arrangement for writing the identification code of the mass and position of each weight, even if positions of weights change in a machine in which the installation pattern of the weights changes, the moment of each individual weight can be detected, thereby allowing acquisition of correct capability data.

Next, the information detected by the tags 9 to 13 and the reader 14 is sent to the overload preventing apparatus 15 provided in the cabin 5 by wireless communications, and a crane capability is set based on this information.

In this embodiment, the plurality of weights 6*a*, 6*b*, 6*c*, and the like are provided to the base machine A, and the ID tags 9 to 13 are arranged for each of the weights, while ID information transmitted from the tags 9 to 13 is read by the single reader 14. Since the reader 14 is all that is needed for reading, it is possible to reduce its installation space therefor as well as its production cost.

In a crane in which an overload preventing apparatus 15 performing an overload preventing operation based on a crane capability that has been set using mounting conditions of weights as one factor of the crane capability, is installed to the upper rotating body 2 in the base machine A, this embodiment is configured so that the overload preventing apparatus 15 sets the crane capability based on weight mounting conditions detected by the weight detecting apparatus according to the present invention.

Operations of this overload preventing apparatus 15 will be described with respect to a flowchart in FIG. 3.

The crane capability is determined by working conditions (mounting conditions of weights or a weight, the length of a boom, etc.), and its setting is performed directly before the start of the working, that is, directly after the overload preventing apparatus 15 has started. If working conditions are changed (e.g., the boom length is changed) after a setting has once been performed, the setting of the capability is performed anew under the changed working conditions.

First, in step S1, it is determined whether the overload preventing apparatus 15 has just started. If the determination in S1 is NO, it is further determined whether the working conditions are being set.

If the determinations in steps S1 and S2 are both NO, the last setting is continued under the determination that the working conditions are not yet being set.

If the determination in either one of steps S1 and S2 is YES, the process advances to step S4, where ID information (the number of weights, the position and mass of each of the weights, etc.) sent from the reader 14 is acquired.

Thereafter, based on the acquired ID information, conforming capability data is selected from capability data stored in advance (step S5), and then it is determined whether the selected capability data and the capability data set by an operator match with each other (step S6).

If the determination in step S6 is NO, i.e., if the selected capability data and the capability data set by the operator do not match with each other, then, in step 7, the operator is subjected to a warning by lighting, buzzer activation or the like, and processing for bringing the machine into an automatic stop is performed (to be exact, processing for preventing the machine from starting is performed, since the operation has not yet been started).

On the other hand, if the determination in step S6 is YES, i.e., if the selected capability data and the capability data set by the operator match with each other, then, in step 8, a capability setting by the operator is permitted. This enables an operation based on a set capability to be performed.

Here, the "capability data" in step 5 refers to a portion determined by weight mounting conditions out of various pieces of data determining a crane capability, for example, a moment by an individual weight, a moment by an overall counterweight, a moment by an overall carbody weight, or the like.

In this manner, the setting of crane capability is performed based on weight mounting conditions detected by the detecting apparatus (the capability setting is permitted only when the data selected by the operator conforms to the detected data). This makes it possible to reliably prevent erroneous settings and enhance the reliability of overload preventing operations, combined with the detection itself being able to be made highly-accurate and stable.

Also, regarding the carbody weights 7 mounted on the side of the lower traveling body 1, information can be exchanged by wireless communications between the tags 12 and 13 and the reader 14. This eliminates the need to add a transmission device, such as a slip ring serving as means for sending information to the overload preventing apparatus 15 on the upper rotating body side. As a result, the detection structure becomes simple, which facilitates retrofitting thereof.

OTHER EMBODIMENTS (1) According to the above-described basic embodiment, in the overload preventing apparatus 15, the capability data selected based on ID information and the capability data set by an operator was compared with each other, and when these capability data match with each other, a capability setting by the operator was permitted. However, the capability setting may be directly and automatically performed based on the acquired ID information.

Figure 4:
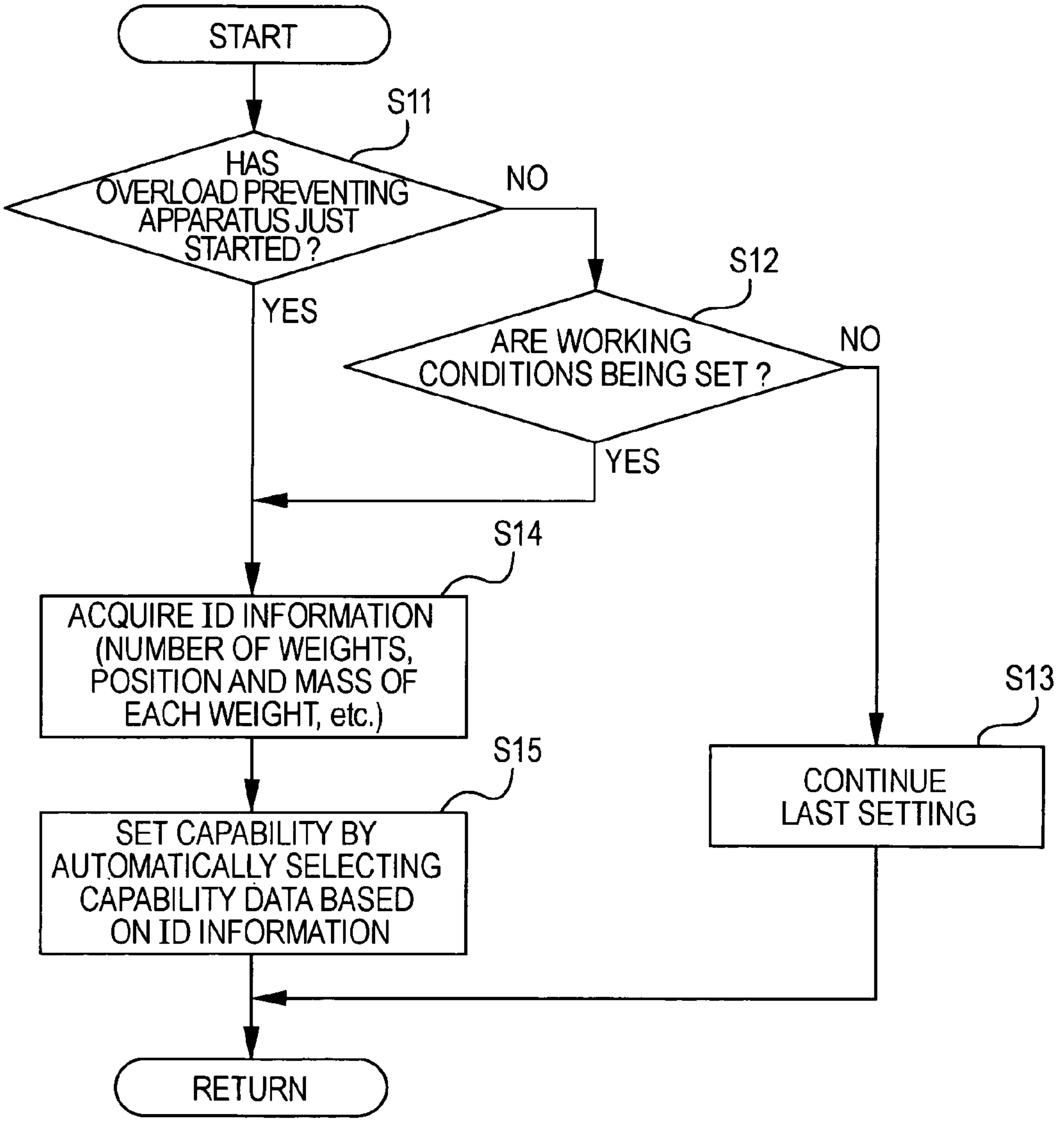
FIG. 4 is a flowchart showing another embodiment of the present invention.

Specifically, as shown in FIG. 4, after steps 11 to 14 that are the same as steps S1 to S4 in FIG. 3 have been executed, two steps, i.e., the selection of capability data based on the ID information in step S5 in FIG. 3, and the comparison between the selected data and the data selected by the operator in step 6, are omitted, and in step S15, a capability setting is performed by automatically selecting capability data based on ID information.

Since the setting of crane capability is performed by automatically selecting the capability data based on weight mounting conditions detected by the detecting apparatus according to the present invention, it is possible to reliably prevent erroneous settings and enhance the reliability of overload preventing operations, combined with the detection itself being able to be made accurate.

Figure 5:
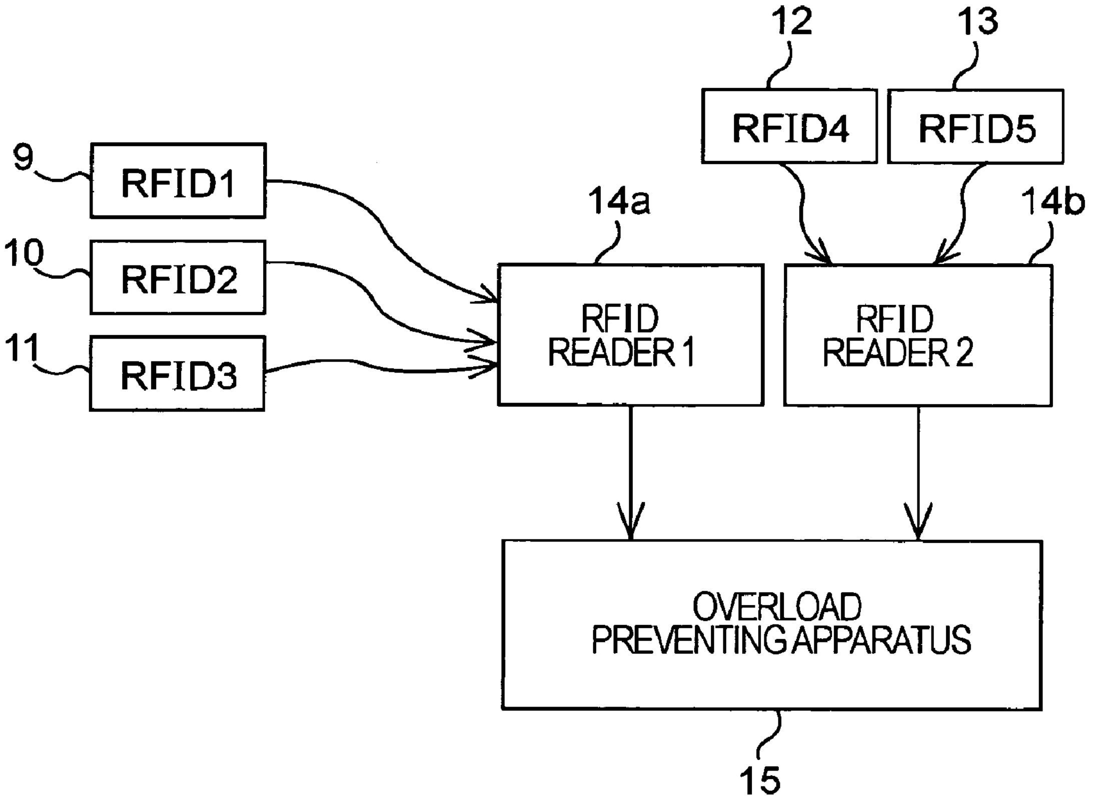
FIG. 5 is a block diagram of still another embodiment of the present invention.

(2) In the above-described basic embodiment, an arrangement was adopted in which a single reader 14 reads ID information in all tags 9 to 13. However, as shown in FIG. 5, the arrangement may be such that two readers 14*a* and 14*b* are provided in correspondence with the kinds of weights, i.e., two kinds of weights: the counterweight 6 (weight members 6*a*, 6*b*, and 6*c*) and the carbody weights 7, and that the ID information is read for each of the kinds of weights by two readers 14*a* and 14*b*, with the readers being sorted by the kind of weight.

That is, the present arrangement is configured so that a plurality of weights are provided, and ID tags are provided for each of the weights, as well as ID information transmitted from each of the ID tags is read by a plurality of ID readers, with the ID readers being sorted by the kind of weight.

The use of this arrangement allows the patterns of ID codes to be written in the tags 9 to 13 to be simplified, because a plurality of ID readers share reading a plurality of pieces of information. Furthermore, the combinations between tags 9 to 13, and the readers 14*a* and 14*b* can be specified, and wireless communication distance between the readers 14*a* and 14*b* can be set to a shorter value. This eliminates the possibility of erroneously reading information from another machine, for example.

Alternatively, a reader may be individually provided to each of the tags 9 to 13, and an exchange of information may be individually made between each of the readers and a respective one of the tags.

(3) The above-described embodiments are configured so as to be able to detect a plurality of pieces of information, such as the number of weights, the position and the mass of each individual weight, but-the configuration may be such one that detects only some of the above-described plurality of pieces of information, or detects merely the presence/absence of weights or a weight.

(4) The above-described embodiments are configured so as to utilize detected information as a capability data for overload prevention, but the detecting apparatus according to the present invention can also be used only for displaying tag information by a monitor or the like.

(5) Since, usually, the weights such as counterweights and carbody weights are each made of metal in whole or in part, magnetic fluxes in the ID tags might interfere with information exchanges between Id readers and ID tags under influence of electromagnetic induction. Accordingly, RFID tags of a metal-compatible type are preferably used as ID tags. In this case, since metal-compatible type RFID tags, i.e., ID tags that eliminate the influence of metal by the setting of a certain frequency, or the like, are used as ID tags, it is possible to ensure a more stable detection operation.

(6) Furthermore, when weights on the lower traveling body side are objects to be detected, as in the case of carbody weights, information can be exchanged by wireless communications between ID tags and ID readers, and therefore, there is no need to add a transmission device such as a slip ring, serving as means for sending information to the overload preventing apparatus on the upper rotating body side. As a result, the detection structure is simplified, thereby notably facilitating the retrofitting thereof.

Although the invention has been described with reference to the preferred embodiments in the attached figures, it is noted that equivalents may be employed and substitutions made herein without departing from the scope of the invention as recited in the claims.

What is claimed is:

1. A weight detecting apparatus for a crane, the apparatus comprising: a weight for enhancing the stability of the machine body of the crane, the weight being mounted on a base machine comprising a lower traveling body and an upper rotating body rotatably mounted on the lower traveling body; an identification (ID) information holding medium which is installed on the weight, and in which ID information on weight mounting conditions has been written; and an ID reader for reading the ID information, the ID reader being installed to the upper rotating body, wherein the mounting conditions of the weight are detected by wireless communications between the ID reader and the identification information holding medium, and wherein said weight mounting conditions include the mass and the position of the weight on the base machine.

2. The weight detecting apparatus for a crane according to claim 1, wherein a plurality of the weights is mounted on the base machine;

wherein the identification information holding medium is installed on each of the plurality of weights; and wherein the ID reader is a single ID reader and ID information transmitted from each of the ID information holding media is read by the single ID reader.

3. The weight detecting apparatus for a crane according to claim 1, wherein a plurality of the weights is mounted on the base machine;

wherein the identification information holding medium is installed on each of the plurality of weights; and wherein the ID reader consists of a plurality of ID readers and ID information transmitted from each of the ID information holding media is read by the ID readers, with the readers being sorted by the kind of weight.

4. The weight detecting apparatus for a crane according to claim 1, wherein a counterweight constituted of a plurality of weight members is mounted on the rear end of the upper rotating body in the base machine; and wherein the identification information holding medium is installed on each of the weight members of the counterweight.

5. The weight detecting apparatus for a crane according to claim 1, wherein at least one carbody weight is installed on a carbody in the lower traveling body in the base machine; and wherein the at least one identification information holding medium is installed on the at least one carbody weight on a one-to-one basis.

6. The weight detecting apparatus for a crane according to claim 1, wherein a RFID tag of a metal-compatible type is used as the identification information holding medium.

7. The weight detecting apparatus for a crane according to claim 1, wherein an identification code of the mass of the weight to which the identification information holding medium has been installed, is written in the identification information holding medium.

8. A crane comprising: a lower traveling body; an upper rotating body rotatably mounted on the lower traveling body, the upper rotating body constituting a base machine together with the lower traveling body; a weight mounted on the base machine; and an overload preventing apparatus installed to the upper rotating body, the overload preventing apparatus performing an overload preventing operation based on a crane capability that has been set using mounting conditions of the weight as one factor of the crane capability, wherein the overload preventing apparatus sets the crane capability based on weight mounting conditions detected by a weight detecting apparatus comprising an identification (ID) information holding medium which is installed on the weight, and in which ID information on weight mounting conditions has been written; and an ID reader for reading the ID information, the ID reader being installed to the upper rotating body, wherein the mounting conditions of the weight are detected by wireless communications between the ID reader and the identification information holding medium, and wherein said weight mounting conditions include the mass and the position of the weight on the base machine.

9. The crane according to claim 8, wherein the overload preventing apparatus permits the setting of a crane capability only when capability data selected by an operator from a plurality of different pieces of capability data on weight mounting conditions, stored in advance, conforms to detected weight mounting conditions.

10. The crane according to claim 8, wherein the overload preventing apparatus sets a crane capability by automatically selecting capability data conforming to the detected weight mounting conditions, from a plurality of different pieces of capability data on weight mounting conditions, stored in advance.

* * * * *